2,844,511

PROCESS FOR PREPARING IMPROVED ACTH

Norman G. Brink, Westfield, Frederick A. Kuehl, Jr., Rumson, and Karl Folkers, Plainfield, N. J., assignors to Merck & Co., Inc., Rahway, N. J., a corporation of New Jersey No Drawing. Application November 14, 1956
Serial No. 621,984

15 Claims. (Cl. 167—74)

This invention is concerned generally with purified extracts of pituitary glands having the activity of the adrenocorticotropic hormone. More particularly, it relates to purified hydrolysates of the adrenocorticotropic hormone which possess the property of producing remission of clinical and laboratory symptoms of reheumatoid arthritis and related diseases, and which exhibit to a lesser extent or not at all the undersirable side effects produced by the adrenocorticotropic hormone itself.

This application is a continuation-in-part of our application Serial No. 225,674, filed May 10, 1951, which, in turn, is a continuation-in-part of application Serial No. 166,546, filed June 6, 1950, both now abandoned.

The adrenocorticotropic hormone, hereinafter referred to in this application by the abbreviated term ACTH, can be isolated, in substantially pure form, from the pituitary glands of sheep according to the procedure described by Li et al. (J. Biol. Chem. 149, 413–424 (1943)); or from the pituitary glands of hogs by the method of Sayers et al. (J. Biol. Chem. 149, 425, (1943)). This hormone has been reported by various workers to produce remission of the clinical symptoms of reheumatoid arthritis. When ACTH is used in clinical treatment, however, it has been found to cause undesirable side effects, the most important of which is water retention (antidiuretic effect) which results in edema and weight gain, heart strain and occasionally congestive heart failure. Other undesirable side effects include occasional hypertension, a rise in the uric acid-creatinine ratio, sodium retention, and disappearance of eosinophiles from the blood.

The adrenocorticotropic hormone, as well as crude extracts thereof, has been subjected to hydrolytic cleavage by prior workers, and the hydrolysates have been tested for hormonal activity. Although some of these prior hydrolysates have been found to possess adrenocorticotropic activity, none has been found to be free of the undesirable side effects characteristic of ACTH itself. For example, when ACTH is hydrolyzed by means of acids, or by the enzyme pepsin as described in the prior art, the resulting ACTH hydrolysates (although possessing clinical activity in the treatment of rheumatoid arthritis and related diseases) have invariably shown the undesirable side effects characteristic of ACTH, even where these hydrolysates have been subjected to a purification operation. Other methods of hydrolysis, utilizing aqueous alkali, or the enzyme trypsin, have proved entirely unsatisfactory for producing an improved product since the ACTH hydrolysates thus obtained are nearly devoid of adrenocorticotropic activity.

Moreover, in the case of the active hydrolysates obtained when ACTH is hydrolyzed by means of acids or pepsin, the ACTH hydrolysates are contaminated with unwanted substances of lower or no ACTH activity which appear to be high molecular weight substances of a proteinaceous nature. Various methods have been reported for separating these substances present in the hydrolysis mixture from the material showing maximum adrenocorticotropic activity. A moderate degree of purification has been achieved by prior workers by treating the hydrolysis mixture with trichloroacetic acid whereby unwanted substances are precipitated from the solution. Crude ACTH hydrolysates have also been freed of such substances present in the mixture by subjecting said hydrolysates to dialysis treatment. Although these prior methods have accomplished a moderate increase in the adrenocorticotropic activity of the ACTH hydrolysates, they have uniformly failed to give a product free of the undesirable side effects hereinabove set forth. Moreover, these prior purification methods utilizing trichloroacetic acid or dialysis are inconvenient to carry out, and entirely unsuitable for use in large-scale purification operations.

It is now discovered, according to the present invention, that acid hydrolysates of ACTH can be prepared which possess clinical activity equal to or superior to that shown by ACTH, and which, in clinical use, do not exhibit the undesirable side effects uniformly noted with ACTH itself. We have further discovered that improved acid hydrolysates which possess high ACTH activity, but which do not exhibit the undesirable side effects characteristic of ACTH, can be prepared utilizing, as starting materials, pepsin digests of ACTH and concentrates thereof. This discovery is particularly surprising in view of the fact that such pepsin digests, although themselves constituting a hydrolyzed form of ACTH, have invariably exhibited, in clinical use, the sodium retention and antidiuretic effect uniformly noted with ACTH itself.

Moreover, we have discovered that our novel procedure is generally applicable for converting ACTH substances, derived from pituitary glands and characterized as having both adrenocorticotropic and antidiuretic activity, to ACTH hydrolysates having substantially unimpaired adrenocorticotropic activity and substantially no antidiuretic activity. The ACTH substances which can be utilized as source materials in our process include purified ACTH, crude concentrates of ACTH, pepsin digests of such ACTH products, and the like, which are obtained from the pituitary glands of hogs, sheep and cattle (beef). The discovery, that pituitary glands of sheep and cattle serve equally well as source materials for the preparation of ACTH hydrolysates possessing high adrenocorticotropic activity while being free of the undesirable side effects of ACTH itself, is especially noteworthy since it has commonly been belived that hog pituitaries are the most practical source of ACTH activity.

It has been further discovered that such ACTH hydrolysates can be purified by novel purification methods which are adapted for large-scale operation. Utilizing these purification methods, we have been able to prepare purified ACTH hydrolysates which possess over thirteen times the adrenocorticotropic activity possessed by pure ACTH itself.

In conducting the hydrolysis of ACTH according to our procedure, pure ACTH (as prepared by Li et al. (J. Biol. Chem. 149, 413–424 (1943)) or crude extracts of pituitary glands such as the "acid-acetone powder" of Li et al. above cited, or the "crude prolactin" described by Fishman (J. Biol. Chem. 167, 425 (1947)) are hydrolyzed with a non-oxidizing mineral acid under carefully controlled conditions. In its broadest aspects, this hydrolysis operation is carried out under sufficiently drastic conditions merely to inactivate the components of the ACTH which are responsible for the undesirable side effects, without, at the same time, inactivating the simultaneously liberated substance or substances responsible for the adrenocorticotropic activity. Any non-oxidizing mineral acid, such as hydrochloric acid, hydrobromic acid, sulfuric acid, phosphoric acid, and the like, can be utilized in this hydrolysis operation. The concentration of the acid can be varied, although for any given hydrogen ion concentration, the temperature and time of hydrolysis treatment must be adjusted to achieve the proper degree of hydrolysis.

It is ordinarily preferred to employ a mineral acid having a concentration of approximately 0.3 N (which corresponds to a pH of 0.523) as the hydrolizing agent, and to carry out the hydrolysis at a temperature near 100° C. for a period of about one hour. The ratio of mineral acid hydrolizing agent to ACTH should be relatively large so that actual concentration of the mineral acid in the hydrolysis mixture is substantially 0.3 N throughout the course of the hydrolysis reaction, said pH being unaffected by the relatively small amount of ACTH present in the hydrolysis solution at the start of the treatment, or by the ACTH-active material and the hydrolysis products present in the hydrolysis solution at the end of the hydrolysis period. The conditions of acid concentration, temperature, and time of hydrolysis can be varied only within certain limits. If these conditions are too mild (too low acid concentration, too short a time, too low a temperature) the product retains its undesirable side effects; if the conditions are too severe, the product shows a partial or complete loss of ACTH activity. For example, when ACTH is hydrolyzed in 0.1 N hydrochloric acid at 100° C. for one hour, according to the prior art procedure described by Li, Evans and Simpson (J. Biol. Chem. 149, 413 (1943)), or using still weaker acid i. e. 0.1 N to 0.0000001 N, corresponding to a pH of 1.0 to 7.0, on the boiling water bath for one to three hours, as disclosed by Collip (Symposia Quant. Biol. 5, 212), the ACTH activity is retained, but the product possesses to a marked extent the undesirable antidiuretic effect. Similarly, when the hydrolysis is carried out in 6 N hydrochloric acid at 37° C. for four hours (cf. Li, Macy Foundation, Transactions of the Seventeenth Meeting, Conference on Metabolic Aspects of Convalescence, New York, N. Y., 1948, p. 114), the product causes a retention of sodium in clinical trials. Increase in time of hydrolysis, utilizing 6 N acid at 37° C., leads to a loss of ACTH activity.

For the preparation of an ACTH product having substantially unimpaired adrenocorticotropic activity and substantially no antidiuretic activity, the following optimum conditions have been established: For hydrolysis for one hour at 100° C., the acid concentration in the hydrolysis mixture, throughout the course of the hydrolysis reaction, must be greater than 0.1 N, but not greater than 0.6 N. Thus, the concentration of mineral acid in the hydrolysis mixture should be within the range of 0.2 N to 0.6 N, and the pH of the mixture should therefore be between pH 0.22 and pH 0.7; the pH may either be determined by direct measurement of the hydrolysis mixture or may be calculated from the normality, N, by means of the following equation: $pH = -\log_{10} N$. When 0.3 N acid (pH 0.523) at 100° C. is used the hydrolysis must be carried out for more than fifteen minutes, but for less than four hours. For hydrolysis in 0.3 N acid for one hour, the temperature must be greater than 60° C., but less than 115° C. Thus, it is ordinarily preferred to hydrolyze the ACTH substance with an aqueous mineral acid having a normality between about 0.2 N and 0.6 N (pH 0.22 to pH 0.7), at a temperature between about 60 and 115° C., and for a period of time between approximately thirty minutes and one hour. When utilizing hydrolysis conditions within the range: 0.2 N acid (pH 0.7) at about 100–115° C. to 0.6 N acid (pH 0.22) at about 60–80° C., the time of heating can be increased up to two hours, if desired, whereas, utilizing hydrolysis conditions within the range: 0.3 N acid (pH 0.523) at about 100–115° C. to 0.6 N (pH 0.22) acid at about 80–100° C., the time of heating can be decreased to about fifteen minutes. It is also evident that higher acid concentrations than those preferred can be employed if the time of heating is shortened or the temperature lowered. Correspondingly, the other variables of time and temperature can be altered within reasonable limits to achieve the desired result of a product which possesses substantially unimpaired ACTH activity and which is free from the unwanted side effects of antidiuretic action and sodium retention.

We have discovered that the ACTH hydrolysates thus obtained can be purified so as to produce purified ACTH hydrolysates free of the side effects characteristic of ACTH and possessing over 1300% of the adrenocorticotropic activity of ACTH. In conducting this purification operation, we ordinarily employ one or more of several purification operations.

It has been found that a considerable degree of purification of the ACTH hydrolysate is accomplished by extracting an aqueous solution of said ACTH hydrolysate with a mixture of phenol and an organic solvent which is either partially or totally immiscible with water such as butanol, chloroform, and the like. In carrying out this extraction operation, it is ordinarily preferred to dissolve the ACTH hydrolysate (which can be readily obtained in solid form by drying the hydrolysis mixture in the frozen state) in water and washing the aqueous solution with a mixture consisting of phenol and organic solvent. When chloroform is employed, a ratio of two parts phenol to one of chloroform is preferred, although the ratio of phenol to chloroform can be varied if desired. The aqueous solution is then washed with the organic solvent (chloroform, butanol and the like) and then with ether to remove phenol, and the resulting aqueous solution is dried from the frozen state to produce the purified ACTH hydrolysate in solid form.

The foregoing extraction procedure has been found to remove unwanted substances, described above, from the ACTH hydrolysate. The purified ACTH hydrolysate thus produced, when tested according to the rat assay of Sayers et al. (Endocrinology, 42, 378 (1948)), gives a value of approximately 100%, which is equivalent to the value obtained for Armour Standard ACTH. When administered to a patient with rheumatoid arthritis, this product is fully active in inducing remission of the symptoms, the effect being equivalent to the clinical responses obtained with Armour Standard ACTH (L. A. 1050). Moreover, in clinical use, this product is substantially free of side effects: the sodium retention, water retention and eosinophile drop in the patient being negligible as compared with the values consistently observed in similar treatment with ACTH.

The purified ACTH hydrolysate prepared utilizing the phenol-organic solvent treatment described above can be further purified if desired. This further purification is accomplished by dissolving the product in methanol and diluting the methanol solution with ether, whereupon a more purified ACTH hydrolysate precipitates and can be recovered by filtration. This latter product is slightly more active than the materials obtained following the phenol-organic solvent treatment, is more stable, and is substantially free of hydrochloric acid which is removed by this procedure. This methanol-ether precipitated ACTH hydrolysate is also less hygroscopic, denser, and is in generally improved physical state as compared with the starting material.

Where it is desired to prepare a highly-active product which is free of side effects, the crude ACTH hydrolysate is first subjected to the phenol-organic solvent extraction procedure followed by precipitation of the partially purified hydrolysate from methanol solution by the addition of ether. This purified ACTH hydrolysate fraction is then dissolved in methanol and the resulting solution is treated with a methanol solution containing triethylamine, at which time a white precipitate forms. This product, which is a still more purified form of the ACTH hydrolysate, in the form of the free base, is readily recovered by centrifugation or filtration. It is highly active, showing an assay activity of 200% (according to the rat assay referred to hereinabove), and can be used for the clinical treatment of rheumatoid arthritis while at the same time producing none of the undesirable side effects characteristic of the ACTH.

Alternatively, the ACTH hydrolysate can first be converted to the free base by treatment with triethylamine in methanol solution. The resulting precipitate of ACTH-free base can be dissolved in water and purified by the phenol-solvent washing, and the phenol extraction procedure. Thus, the purification involves extracting an aqueous solution of the free base form of a crude ACTH hydrolysate with a mixture of phenol and another organic solvent, thereby extracting unwanted substances and leaving the base form of the active portion of the ACTH hydrolysate in the aqueous layer; this is followed by extraction of said free base from the aqueous solution by means of phenol. The ACTH hydrolysate in purified form is then recovered by diluting the phenol solution with ether and extracting with acidified water.

In its broadest aspects the hereindisclosed purification procedure comprises the purification of an ACTH hydrolysate, said hydrolysate being obtained by hydrolyzing ACTH with aqueous mineral acid, by one or more of several purification operations. Essential in this purification treatment is the extraction of an aqueous acidic solution of an ACTH hydrolysate by means of a mixture of phenol-organic solvent, which extraction procedure has been found to extract unwanted substances from the aqueous ACTH solution. The product, thus obtained, at the temperature and for the period of time indicated in the table. In each case, the hydrolysis solution was evaporated to dryness in vacuo, and the dry residue was triturated with ether. The ether-insoluble material was then dissolved in methanol (approximately 1 ml.) and precipitated by the addition of ether (about 10 ml.). The precipitates were washed with ether and dried.

The ACTH activities of the ACTH hydrolysates thus obtained were determined utilizing the rat assay of Sayers et al. (Endocrinology 42, 378 (1948)). The antidiuretic activity of each of these ACTH hydrolysates in rats, which has been demonstrated to be a reliable measure of the side effects (i. e., water retention and sodium retention) produced by ACTH products upon clinical administration, was determined as follows: One group of rats was administered, by injection, 1.2 mg./kg. of ACTH hydrolysate, and a second group of rats (uninjected) was set aside as controls; a standard dose of water was administered to each group of rats, and the time required for the animals to excrete 50% of the administered water was measured; the time required for the 50% excretion of the water by the test group, as compared with the time required for 50% excretion by the controls, was taken as a measure of the antidiuretic activity of the sample.

The hydrolysis conditions, the ACTH activity of the ACTH hydrolysate, the antidiuretic effect and the suitability of the product for clinical use are summarized in the following table.

| Acid Concentration in Hydrolysis Solution | Approximate pH of Hydrolysis Solution [3] | Time, Hours | Temp., °C. | ACTH Activity, Percent | Side Effects as Measured by Antidiuretic Test | Product |
|---|---|---|---|---|---|---|
| 0.1 N HCl | 1.0 | 1 | 100 | 95 | AD Positive | Unsatisfactory. |
| 0.3 N HCl | 0.5 | 1 | 100 | 100 | AD Negative | Satisfactory. |
| 0.6 N HCl | 0.2 | 1 | 100 | 70 | do | Do. |
| 1.5 N HCl | <0 | 1 | 100 | None | | Unsatisfactory. |
| 6 N HCl [1] | <0 | 4 | 37 | 100 | AD Positive | Do. |
| 6 N HCl [1] | <0 | 8 | 37 | 50 | | Do. |
| 6 N HCl [1] | <0 | 16 | 37 | None | | Do. |
| 0.3 N HCl | 0.5 | ¼ | 100 | 130 | AD Positive | Do. |
| 0.3 N HCl | 0.5 | ½ | 100 | 90 | AD Negative | Satisfactory. |
| 0.3 N HCl | 0.5 | 2 | 100 | 125 | do | Do. |
| 0.3 N HCl | 0.5 | 4 | 100 | None | | Unsatisfactory. |
| 0.3 N HCl | 0.5 | 1 | 37 | | AD Positive | Do. |
| 0.3 N HCl | 0.5 | 1 | 60 | | AD Positive (slight) | Doubtful. |
| 0.3 N HCl | 0.5 | 1 | 115 | 75 | AD Negative | Satisfactory. |
| 0.3 N HCl | 0.5 | 1 | 148 | None | | Unsatisfactory. |
| 0.3 N $H_2SO_4$ [2] | 0.5 | 1 | 100 | 105 | AD Negative | Satisfactory. |
| 0.3 N HBr | 0.5 | 1 | 100 | 110 | do | Do. |

[1] Hydrolysis solution diluted with about 10 volumes of water before evaporation to dryness.
[2] Adjusted to pH 3.9 with $Ba(OH)_2$ and filtered before evaporated to dryness.
[3] pH of hydrolysis solution remains substantially constant throughout the hydrolysis reaction.

is substantially free of undesirable side effects characteristic of the ACTH and can be utilized as set forth hereinabove. If desired, this product can be subjected to further purification treatment involving precipitation of the partially-purified salt of the ACTH hydrolysate from methanol solution by the addition of ether, which procedures yield products which have substantially no undesirable side effects in clinical studies. Alternatively, where the free base of the ACTH hydrolysate is desired, instead of the salt thereof, the salt is dissolved in methanol and precipitated therefrom by the addition of triethylamine to the methanol solution, thereby precipitating the free base of the ACTH hydrolysate.

The following examples illustrate methods of carrying out the present invention, but it is to be understood that these examples are given for purposes of illustration and not of limitation.

*Example 1*

Seventeen samples of ACTH (prepared substantially as described in J. Biol. Chem. 167, 425 (1947)) of about 30 mg. each were dissolved in 20 ml. portions of dilute aqueous mineral acid (the particular acid and its concentration utilized for the hydrolysis of each sample is given in the table hereinbelow) and the resulting solution heated

*Example 2*

A sample of ACTH was prepared according to the method described in J. Biol. Chem. 167, 425 (1947) for the isolation of purified ACTH. It was found by the rat assay to possess marked antidiuretic activity. Thus, the time required for an excretion of 50% of an administered dose of water was 214 minutes in rats given 1.2 mg./kg. of the ACTH sample, whereas the corresponding time for the control (uninjected) rats was 79 minutes. The same ACTH preparation was tested clinically. It exerted a moderate effect on the patient's arthritis, but caused some retention of sodium and a marked water retention.

Five and one-tenth grams of the ACTH sample of the preceding paragraph, were dissolved in 100 ml. of boiling 0.3 N hydrochloric acid, and the solution (pH about 0.5) was boiled under reflux for one hour. The solution (pH about 0.5) was then cooled and evaporated to dryness in vacuo, while maintaining the temperature below room temperature. The residual material was dissolved in 100 ml. of water and this solution was washed with two 100 ml. portions of a mixture (2:1) of liquefied phenol and chloroform. The aqueous solution was then washed with chloroform and ether to remove phenol, and lyophilized. The lyophilized residue was dissolved in 20 ml. of methanol and precipitated by the addition of 115 ml. of ether. The precipitate was dried in vacuo to give a pale brownish-tan powder, 715 mg. In the rat assay, the product gave a value of 100%, approximately equivalent to the activity of Armour Standard ACTH. In a clinical trial, it was administered to a patient with rheumatoid arthritis in a dosage of 12.5 mg. every 6 hours for one day. It was found to be fully active in inducing remission of symptoms, the effect being equivalent to the clinical response obtained with Armour Standard ACTH (L. A. 1050). No significant sodium or water retention in the patient was noted.

Analyses showed the composition of the product to be: carbon, 38.79%; hydrogen, 6.49%; nitrogen, 14.79%; chlorine, 16.27%; sulfur, 2.07%. It contained 3.92% of amino-nitrogen (Van Slyke). A complete acid hydrolysis (6 N hydrochloric acid at 150° C. for 16 hours), followed by a Van Slyke determination, gave a value of 14.59% peptide-nitrogen.

Example 3

A portion of 1.71 g. of an ACTH hydrolysate fraction, which had been prepared and purified according to the method indicated in Example 2, was dissolved in 17 ml. of cold (5° C.) methanol and treated with a solution of 1 ml. of triethylamine in 5 ml. of methanol. After standing at 5° C. for five minutes, the white precipitate was removed by centrifugation. It was washed with four 10 ml. portions of cold (5° C.) methanol, three 40 ml. portions of ether, and dried in vacuo. The product, 436 mg., showed an assay value of 220%.

Example 4

A solution of 20.0 g. of "crude prolactin" (prepared as described in J. Biol. Chem. 167, 425 (1947)) in 400 ml. of 0.3 N hydrochloric acid was boiled under reflux for one hour. The solution (pH about 0.5) was cooled and concentrated to dryness in vacuo below room temperature. The residue was disolved in 500 ml. of water and the aqueous solution was washed with two 375 ml. portions of 2:1 (v./v.) liquefied phenol; chloroform. The aqueous solution was then washed with three 1 liter portions of chloroform and one 1 liter portion of ether, after which it was filtered and lyophilized. The lyophilized material was triturated with 78 ml. of methanol, and the portion of the material insoluble in the methanol was discarded. The methanolic solution was treated with 460 ml. of ether, and the resulting precipitate was collected by centrifugation and dried. The yield at this stage was 2.65 g.

The 2.65 g. of material was dissolved in 26 ml. of methanol, a small insoluble residue was removed, and the solution was treated with 9 ml. of a 5:1 (v./v.) methanol-triethylamine mixture. The precipitate which formed was collected, washed with four 10 ml. portions of cold methanol and three 40 ml. portions of ether and dried in vacuo. The yield in purified free base was 606 mg.

Example 5

A 30 g. portion of crude ACTH designated as "acid-acetone powder" (prepared from sheep pituitaries substantially according to the method described in J. Biol. Chem. 149, 413 (1943)) was dissolved in 600 ml. of hot 0.3 N hydrochloric acid and the solution was boiled under reflux for one hour thereby hydrolyzing the ACTH. The hydrolyzed solution (pH about 0.5) was then concentrated in vacuo to dryness. The residual material was extracted with 300 ml. of methanol, and the insoluble residue was discarded. The methanolic solution was poured into 3.5 l. of ether, and the resulting precipitate was collected, washed with ether and dried to produce a partially purified hydrochloride of the ACTH hydrolysate.

The latter product was dissolved in 150 ml. of methanol and the solution was treated with 30 ml. of a mixture of one part triethylamine: one part acetic acid: five parts methanol, thereby converting the hydrochloride of the ACTH hydrolysate to the corresponding crude free base which was washed with four 15 ml. portions of methanol and dried. The crude free base of the ACTH hydrolysate was dissolved in 75 ml. of the aqueous phase resulting from a mixture of three parts of butanol: two parts of liquefied phenol: five parts of water, at which point a small insoluble residue was removed and discarded. The aqueous solution of the crude free base of the ACTH hydrolysate was washed with four 75 ml. portions of the organic phase of the above-butanol-phenol-water mixture, and the organic phase was discarded after each washing.

The aqueous phase was then extracted with one 75 ml. portion of liquefied phenol thereby transferring the free base of the ACTH hydrolysate to the phenol layer. The phenol solution was diluted with 750 ml. of ether and the resulting mixture extracted with three 75 ml. portions of water which had been acidified with hydrochloric acid. The combined aqueous extracts were washed three times with ether and concentrated to dryness to produce the hydrochloride of the ACTH hydrolysate in purified form. This material was further purified and freed of residual HCl by dissolving it in about 20 ml. of methanol and adding 200 ml. of ether. The precipitate which formed was collected, washed with ether, and dried in vacuo to produce 0.76 g. of the hydrochloride of the ACTH hydrolysate in highly purified form. This final product showed an activity in the rat assay of 630% with respect to Armour Standard ACTH. It showed no antidiuretic activity when tested in animals.

Example 6

One gram of hog "crude prolactin," prepared as described in the article by Fishman (J. Biol. Chem. 167, 425 (1947)), was treated with 20 ml. of boiling 0.3 N hydrochloric acid, and the mixture was boiled for one hour, cooled, and after the addition of two drops of tributyl citrate to prevent foaming it was concentrated to dryness in vacuo. The product, a grayish purple solid, was triturated with three 5 ml. portions of methanol. The methanol-insoluble residue was discarded, and the combined clear methanolic extracts were treated with 150 ml. of ether, giving a light-colored precipitate. The preciptiate was collected by centrifugation and dried in vacuo. The product weighed 547 mg. and showed an ACTH assay value of 120%. It was tested in animals and found to be devoid of antidiuretic activity.

The product was tested clinically in a patient with rheumatoid arthritis. It was given for four days, 81 mg. the first day, and between 37 and 48 mg. for the next three days. It produced an excellent remission of the arthritis, with no significant sodium retention or antidiuretic effect. The patient's sedimentation rate dropped satisfactorily.

Example 7

To 1.0 g. of hog "crude prolactin" (the same starting material utilized in Example 6 hereinabove) was added 8.5 ml. of 6 N hydrochloric acid, and the mixture (pH below 0) was kept at 37° C. for four hours. It was then diluted to 100 ml. with water and lyophilized.

The resulting white solid was triturated with three 5 ml. portions of methanol. The methanol-insoluble material was discarded and the combined methanol extracts treated with 150 ml. of ether. The resulting white precipitate was collected and dried. It weighed 386 mg., and showed an animal ACTH assay value of 110%. However, animal tests showed the presence in the sample of antidiuretic material.

Example 8

A 60 g. portion of ACTH concentrate (hog acid-acetone powder) was treated with 1200 ml. of hot 0.3 N hydrochloric acid and the solution (ph about 0.5) was heated under reflux for one hour, cooled, and after addition of three drops of tributyl citrate it was concentrated to dryness in vacuo. The wet residue was dried by lyophilization. The product was extracted with 600 ml. of methanol and the methanol solution, after removal of the insoluble portion, was poured into ca. 3.5 l. of ether. The resulting precipitate was collected, washed with 600 ml. of ether, and dried. The product weighed 27 g., and had an ACTH activity of 120%. It was non-toxic, and showed no sign of antidiuretic effect.

Example 9

A 1.77 g. portion of "crude prolactin" obtained from beef pituitary glands was hydrolyzed by dissolving in 25 ml. of 0.3 N hydrochloric acid and heating the solution (pH about 0.5) under reflux for one hour. The solvent was removed by lyophilization and the dried product extracted with 12 ml. of methanol. An insoluble fraction was removed and the methanol solution was poured into 100 ml. of ether. The resulting precipitate was collected, washed with 20 ml. of ether, and dried in vacuo. The product, 555 mg., had an assay value of 80%.

After further purification of this material utilizing the procedure described in Example 5 hereinabove, there was obtained a purified ACTH hydrolysate which was free of antidiuretic effect, and which had an assay value of 700%.

Example 10

A 1.279 g. portion of "crude prolactin" obtained from sheep pituitary glands was hydrolyzed by heating for one hour in 0.3 N hydrochloric acid at 100° C. The solution was lyophilized and the product extracted with 17 ml. of methanol. The methanol solution was treated with 100 ml. of ether. The resulting precipitate was washed with 20 ml. of ether and dried in vacuo. It weighed 632 mg., and had an assay value of 85%.

After further purification of this material utilizing the procedure described in Example 5 hereinabove, there was obtained a purified ACTH hydrolysate which was free of antidiuretic effect, and which had an assay value of 560%.

Example 11

Ten grams of an ACTH concentrate of activity 190% was prepared by extracting defatted hog pituitary glands with acetic acid and precipitation of the material from the acetic acid solution by dilution with ether (cf. Astwood, Cleroux, Payne, and Raben, J. New Eng. Med. Center, January 1950, p. 2). The material was hydrolyzed by dissolving it in 200 ml. of 0.3 N hydrochloric acid, and refluxing the solution for one hour. The solution (pH about 0.5) was cooled, concentrated, and the wet residue dried by lyophilization. The product was extracted with 100 ml. of methanol, an insoluble portion removed, and the methanol solution was poured into 1 liter of ether. The resulting precipitate was collected, washed with 200 ml. of ether, and dried. It weighed 2.74 g. and had an activity of 170%. It had no antidiuretic action.

In a modification of the procedure described above, the lyophilized hydrolysate was extracted with 90% acetic acid-10% water instead of methanol, and the acetic acid extract (200 ml.) was poured into 2 l. of ether. A product similar to that described above was obtained, but the yield was increased to 6.51 g.

The above procedure was repeated on a corresponding ether precipitate of an acetic acid extract of sheep pituitary glands, using the methanol extraction of the lyophilized hydrolysate. From 20 g. of material, 2.34 g. of product, with an activity of 110% and free of antidiuretic material, was obtained.

Example 12

A 100 mg. portion of hog "acid-acetone powder" was dissolved in 5 ml. of 0.3 N sulfuric acid, and the solution (pH about 0.5) was heated under reflux for one hour. It was then adjusted to pH 3.9 by addition of barium hydroxide solution. The precipitate was removed, and the clear supernatant solution lyophilized. The dried residue was extracted with methanol, and the methanol solution treated with 45 ml. of ether. The resulting precipitate was washed with ether and dried. It had an activity of 105%, and showed no antidiuretic action.

Example 13

A 100 mg. portion of hog "acid-acetone powder" was dissolved in 5 ml. of 0.3 N hydrobromic acid, and the solution was heated under reflux for one hour. The solution (pH about 0.5) was then lyophilized. The residual material was extracted with 5 ml. of methanol, and the methanol solution was poured into 45 ml. of ether. The resulting precipitate was washed with 5 ml. of ether, and dried in vacuo. The resulting ACTH hydrolysate had an activity of 110%, and showed no antidiuretic action.

Example 14

A 60 g. portion of ACTH concentrate (hog acid-acetone powder) was treated with 1200 ml. of hot 0.3 N hydrochloric acid and the solution was heated under reflux for one hour, cooled, and after addition of three drops of tributyl citrate it was concentrated to dryness in vacuo. The wet residue was dried by lyophilization. The product was extracted with 600 ml. of methanol, and the methanol solution, after removal of the insoluble portion, was poured into ca. 3.5 l. of ether. The resulting precipitate was collected, washed with 600 ml. of ether, and dried.

This product was extracted with 300 ml. of methanol, and the insoluble residue discarded. To the methanol solution was added 60 ml. of a mixture of 1 volume of triethylamine: 1 volume of acetic acid: 5 volumes of methanol. The resulting free base precipitate was collected, washed with four 30-ml. portions of cold methanol and then with one 50 ml. portion of ether, after which it was dried in vacuo.

The free base so obtained was dissolved in 150 ml. of the aqueous phase resulting from the mixture of three volumes of butanol: two volumes of liquefied phenol (88%): five volumes of water. This aqueous solution was then washed with four 150 ml. volumes of the organic phase from the above mixture. After the washing, the aqueous phase was extracted with 150 ml. of liquefied phenol. The liquefied phenol extract was diluted with about 1500 ml. of ether and extracted with three 150 ml. portions of water weakly acidified with hydrochloric acid. The combined acidic aqueous extracts were washed with three 1-l. portions of ether and then concentrated to dryness. The product was dissolved in 30–40 ml. of methanol and poured into ca. 350 ml. of ether. The precipitate was collected, washed with 100 ml. of ether, and dried in vacuo to give 1.95 g. of purified ACTH hydrolysate having an assay value of 725%.

Example 15

A sample of a concentrate of ACTH (Armour's "ACTHAR-A") when tested utilizing the rat test described in Example 1 hereinabove, was found to possess marked antidiuretic activity at dose levels of 1.2, 0.6 and 0.024 mg./kg. A number of ACTH pepsin digests were prepared and tested, and each was demonstrated to have antidiuretic activity, irrespective of the adrenocorticotropic activity.

Sixty-seven milligrams of ACTH pepsin digest, having an adrenocorticotropic activity approximately ten times that of Armour's Standard ACTH La–I–A, was dissolved, in 10 ml. of 0.3 N aqueous hydrochloric acid and the solution (pH about 0.5) was boiled under reflux for a period of 45 minutes. The solution (pH about 0.5) was cooled and evaporated from the frozen state. The residual material was dissolved in methanol and precipitated therefrom by the addition of ether. The precipitated material was recovered by filtration and dried to give 63 mg. of hydrolysate of said ACTH pepsin digest.

In the rat assay, the product was found to possess ACTH activity equal to ten times the activity of Armour Standard ACTH. The therapeutic dose of standard ACTH is of the order of 1.2 mg./kg.; the therapeutic dose of this ACTH hydrolysate is therefore approximately 0.12 mg./kg. When this ACTH hydrolysate was tested using the rat test described in Example 1 hereinabove, it showed no antidiuretic properties when administered to the animals at a dose level of 0.12 mg./kg.

*Example 16*

Sixty grams of porcine acid-acetone powder (prepared as described by Li et al., J. Biol. Chem. 149, 413 (1943) for sheep acid-acetone powder) was dissolved in 600 ml. of boiling 0.3 N hydrochloric acid and the solution was boiled under reflux for a period of one hour. The resulting solution (pH about 0.5) was cooled, and evaporated to dryness in vacuo, below room temperature. The residual material was triturated with 600 ml. of methanol, the methanol-insoluble residue was discarded, and the methanolic solution was poured into 6 liters of ether, whereupon a light-colored precipitate was formed. The precipitate was recovered by centrifugation, washed with ether, and dried in vacuo to give an ACTH hydrolysate which showed an assay value of 120% and no antidiuretic activity in the rat test.

The product was tested clinically in a patient with rheumatoid arthritis. The patient was a 49 year old white male with a twenty-year history of typical rheumatoid arthritis. At the time of this treatment, he had advanced changes involving all peripheral joints. There were contractures, deformities, limitation of motion, morning stiffness, and diffuse rest pain. He was confined to bed in the supine position.

Multiple doses of Armour ACTH in this patient had in the past caused definite but not dramatic improvement, irreparable destructive changes having been blamed for the lack of dramatic response. Moreover, objective evidence of improvement had always been obtainable in the form of a fall of the erythrocyte sedimentation rate.

The patient was observed in the present study for a period of seventeen days. He received no medication during the first eight and last two days of the period. During days 9–15, he received the ACTH hydrolysate described above in doses of 12.5 mg. every six hours. For administration, the sample was dissolved in saline, sterilized by filtration through a Seitz filter, and given by intramuscular injection.

On the morning of day 10 (one day after start of treatment) there was a definite decrease in morning stiffness, together with increased agility. The patient reported that his sleep had been uninterrupted for the first time in weeks. By day 15, he was much better. He slept well, and was able to sit up on the edge of the bed.

The patient's erythrocyte sedimentation rate, which had been between 38 and 43 mm. (Westergran method) during the pre-treatment period, fell to 19–23 mm. during the last three days of treatment (a nearly normal value). No retention of water could be detected, nor was a significant deviation from the normal rate of sodium excretion noted.

Various changes and modifications may be made in carrying out the present invention, without departing from the spirit and scope thereof. Insofar as these changes and modifications are within the purview of the annexed claims, they are to be considered as part of our invention.

We claim:

1. The process of converting an ACTH substance, derived from pituitary glands and characterized as having both adrenocorticotropic and antidiuretic activity, to an ACTH hydrolysate having substantially unimpaired adrenocorticotropic activity and substantially no antidiuretic activity, which comprises heating a solution of said ACTH substance in an aqueous non-oxidizing mineral acid, the normality of said solution being between about 0.2 N and 0.6 N throughout the heating period, at a temperature between about 60 and 115° C., for a period of time varying from a minimum of about fifteen minutes when utilizing hydrolysis conditions within the range 0.3 N acid at about 100–115° C. to 0.6 N acid at about 8–1° C., to a maximum of about two hours when utilizing hydrolysis conditions within the range 0.2 N acid at about 100–115° C. to 0.6 N acid at about 60–80° C.

2. The process of converting an ACTH substance, derived from pituitary glands and characterized as having both adrenocorticotropic and antidiuretic activity, to an ACTH hydrolysate having substantially unimpaired adrenocorticotropic activity and substantially no antidiuretic activity, which comprises heating a solution of said ACTH substance in an aqueous non-oxidizing mineral acid under reflux at a temperature of about 100° C. for a period of time within the range of about thirty minutes to two hours, the normality of said solution being approximately 0.3 N throughout the heating period.

3. The process of converting an ACTH substance, derived from pituitary glands and characterized as having both adrenocorticotropic and antidiuretic activity to an ACTH hydrolysate having substantially unimpaired adrenocorticotropic activity and substantially no antidiuretic activity, which comprises reacting the ACTH substance with an aqueous non-oxidizing mineral acid, the normality of the reaction solution throughout the reaction period being within the range of approximately 0.2 N to 0.6 N, said reaction being carried out by heating the reactants together at a temperature within the range of approximately 60 to 115° C. for a period of time ranging from more than 15 minutes to less than four hours sufficient to substantially eliminate the antidiuretic activity of the ACTH substance without substantially impairing its adrenocorticotropic activity.

4. The process of claim 3 wherein the non-oxidizing mineral acid is hydrochloric acid.

5. The process of claim 3 wherein the non-oxidizing mineral acid is sulfuric acid.

6. The process of claim 3 wherein the non-oxidizing mineral acid is hydrobromic acid.

7. The process of converting an ACTH substance, derived from pituitary glands and characterized as having both adrenocorticotropic and antidiuretic activity, to an ACTH hydrolysate having substantially unimpared adrenocorticotropic activity and substantially no antidiuretic activity, which comprises reacting the ACTH substance with an aqueous non-oxidizing mineral acid, the normality of the reaction solution throughout the reaction period being approximately 0.3 N, and the reaction being carried out by heating the reactants together at 100° C. for a period of one hour.

8. The process of converting an ACTH substance, derived from pituitary glands and characterized as having both adrenocorticotropic and antidiuretic activity, to an ACTH hydrolysate having substantially unimpaired adrenocorticotropic activity and substantially no antidiuretic activity, which comprises heating a solution of said ACTH substance in an aqueous non-oxidizing mineral acid at a temperature of 100° C. for a period of one hour, the normality of said solution throughout the heating period being within the range of about 0.2 N to about 0.6 N.

9. The process of converting an ACTH substance, derived from pituitary glands and characterized as having both adrenocorticotropic and antidiuretic activity, to an ACTH hydrolysate having substantially unimpaired adrenocorticotropic activity and substantially no antidiuretic activity, which comprises heating a 0.3 N aqueous non-oxidizing mineral acid solution of said ACTH substance at 100° C. for a period of time ranging from more than 15 minutes to less than 4 hours sufficient to substantially eliminate the antidiuretic activity of the ACTH substance.

10. The process of converting an ACTH substance, derived from pituitary glands and characterized as having both adrenocorticotropic and antidiuretic activity, to an ACTH hydrolysate having substantially unimpaired adrenocorticotropic activity and substantially no antidiuretic activity, which comprises heating a 0.3 N aqueous non-oxidizing mineral acid solution of said ACTH substance at a temperature within the range of more than 60° C. to less than 115° C. for a period of time sufficient to substantially eliminate the antidiuretic activity of the ACTH substance which time is approximately one hour.

11. The process of converting an ACTH substance derived from pituitary glands and characterized as having both adrenocorticotropic and antidiuretic activity, to an ACTH hydrolysate having substantially unimpaired adrenocorticotropic activity and substantially no antidiuretic activity, which comprises heating a solution of said ACTH substance in an aqueous non-oxidizing mineral acid at a temperature within the range of approximately 60 to 115° C. for a period of time to substantially eliminate the antidiuretic activity of the ACTH substance ranging from 30 minutes to 1 hour, the normality of said solution throughout the heating period being within the range of approximately 0.2 N to 0.6 N.

12. The process of converting an ACTH substance, derived from pituitary glands and characterized as having both adrenocorticotropic and antidiuretic activity, to an ACTH hydrolysate having substantially unimpaired adrenocorticotropic activity and substantially no antidiuretic activity, which comprises heating a 0.2 N aqueous non-oxidizing mineral acid solution of said ACTH substance at a temperature within the range of approximately 100 to 115° C. and for a period of time sufficient to substantially eliminate the antidiuretic activity of the ACTH substance ranging from 1 to 2 hours.

13. The process of converting an ACTH substance, derived from pituitary glands and characterized as having both adrenocorticotropic and antidiuretic activity, to an ACTH hydrolysate having substantially unimpaired adrenocorticotropic activity and substantially no antidiuretic activity, which comprises heating a solution of said ACTH substance in an aqueous non-oxidizing mineral acid at a temperature within the range of approximately 60 to 80° C. for a period of time sufficient to substantially eliminate the antidiuretic activity of the ACTH substance ranging from 1 to 2 hours, the normality of said solution being approximately 0.6 N throughout the heating period.

14. The process of converting an ACTH substance, derived from pituitary glands and characterized as having both adrenocorticotropic and antidiuretic activity, to an ACTH hydrolysate having substantially unimpaired adrenocorticotropic activity and substantially no antidiuretic activity, which comprises heating a 0.3 N aqueous non-oxidizing mineral acid solution of said ACTH substance at a temperature within the range of 100 to 115° C. for a period of time sufficient to substantially eliminate the antidiuretic activity of the ACTH substance ranging from over 15 minutes to 1 hour.

15. The process of converting an ACTH substance, derived from pituitary glands and characterized as having both adrenocorticotropic and antidiuretic activity, to an ACTH hydrolysate having substantially unimpaired adrenocorticotropic activity and substantially no antidiuretic activity, which comprises heating a 0.6 N aqueous non-oxidizing mineral acid solution of said ACTH substance at a temperature of approximately 80 to 100° C. for a period of time sufficient to substantially eliminate the antidiuretic activity of the ACTH substance ranging from over 15 minutes to 1 hour.

References Cited in the file of this patent

UNITED STATES PATENTS

| | | |
|---|---|---|
| 1,860,469 | Lautenschlager | May 31, 1932 |
| 2,073,354 | Schoeller et al. | Mar. 9, 1937 |
| 2,085,768 | Schoeller et al. | July 6, 1937 |
| 2,337,823 | Junkmann | Dec. 28, 1943 |
| 2,362,993 | Fleischer et al. | Nov. 21, 1944 |
| 2,370,154 | Fleischer | Feb. 27, 1945 |

FOREIGN PATENTS

| | | |
|---|---|---|
| 328,347 | Great Britain | May 1, 1930 |

OTHER REFERENCES

Collip: Symposia Quant. Biol., vol. 1937, p. 212.

Li: Macy Foundation, Transactions of the 17th Meeting, Conf. on Metabolic Aspects of Convalescence, pp. 114–121, 1948.

"Recent Progress in Hormone Res.," vol. 7, 1952, pp. 59–73, p. 73 esp. pert., Academic Press Inc., N. Y. C.

Li et al.: Article in J. Biol. Chem., vol. 149, August 1943, pp. 413–424.

Tyslowitz: Article in "Science," September 3, 1943, pp. 225–226.

J. A. M. A., April 29, 1950, p. 1366.

J. A. C. S., June 1950, pp. 2815–2816.

Geschwind et al.: Articles in "Science," October 13, 1950, vol. 112, pp. 436–437.

Payne et al.: Article in J. Biol. Chem., December 1950, pp. 719–731.

Reinhart et al.: Proc. Soc. Exptl. Biol. and Med., April 1951, pp. 836–838.

Pincus: "The Hormones," 1948, Academic Press Inc., N. Y. C., vol. 1, pp. 667–671 and vol. 2, p. 469.